United States Patent
Lee et al.

(10) Patent No.: US 8,126,997 B2
(45) Date of Patent: Feb. 28, 2012

(54) HOT DATA MANAGEMENT METHOD BASED ON HIT COUNTER

(75) Inventors: Sang Min Lee, Daejeon (KR); Hong Yeon Kim, Daejeon (KR); Young Kyun Kim, Daejeon (KR); Han Namgoong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 12/507,327

(22) Filed: Jul. 22, 2009

(65) Prior Publication Data

US 2010/0161780 A1 Jun. 24, 2010

(30) Foreign Application Priority Data

Dec. 22, 2008 (KR) .......................... 10-2008-0131277

(51) Int. Cl.
*G06F 15/173* (2006.01)
(52) U.S. Cl. ........................................ 709/223; 707/748
(58) Field of Classification Search ........................ None
See application file for complete search history.

(56) References Cited

U.S. PATENT DOCUMENTS

| | | | | |
|---|---|---|---|---|
| 5,832,520 | A * | 11/1998 | Miller | 707/999.203 |
| 7,062,570 | B2 * | 6/2006 | Hong et al. | 709/226 |
| 7,143,170 | B2 * | 11/2006 | Swildens et al. | 709/226 |
| 7,403,993 | B2 * | 7/2008 | John et al. | 709/226 |
| 7,596,619 | B2 * | 9/2009 | Leighton et al. | 709/226 |
| 7,912,954 | B1 * | 3/2011 | Oesterreicher et al. | 709/226 |
| 2002/0152318 | A1 * | 10/2002 | Menon et al. | 709/231 |
| 2008/0005475 | A1 | 1/2008 | Lubbers et al. | |

OTHER PUBLICATIONS

NN9106467. "Solutions to Hot Spot Problems in a Data Sharing Transaction Environment." IBM Technical Disclosure Bulletin. Jun. 1991, US. vol. 34, Issue 1. 6 pages.*
Ismail Ari et al., "SANBoost: Automated SAN-Level Caching in Storage Area Networks," Proceedings of the International Conference on Autonomic Computing(ICAC'04), May 2004, IEEE.

* cited by examiner

*Primary Examiner* — Jeffrey R Swearingen

(57) ABSTRACT

Provided is a hot data management method based on hit counter, which prevents loads from being concentrated on a specific data server due to hot data by efficiently managing the hot data in the asymmetric storage system. Each of data servers of an asymmetric storage system checks hit counter for data stored in the corresponding data server to maintain hit counter information on the data in a latest state. The data server transmits the hit counter information to a metadata server at predetermined intervals. The data server makes or deletes a copy of the data according to the determination of the metadata server whether the data is hot data.

14 Claims, 10 Drawing Sheets

HOT DATA MANAGEMENT METHOD BASED ON HIT COUNTER

CROSS-REFERENCE TO RELATED APPLICATIONS

This application claims priority under 35 U.S.C. §119 to Korean Patent Application No. 10-2008-0131277, filed on Dec. 22, 2008, in the Korean Intellectual Property Office, the disclosure of which is incorporated herein by reference in its entirety.

TECHNICAL FIELD

The following disclosure relates to an asymmetric storage system, and in particular, to a hot data management method based on hit counter, which prevents loads from being concentrated on a specific data server due to hot data by efficiently managing the hot data in the asymmetric storage system.

BACKGROUND

For ensuring high expandability, most large scale storage systems adopt an asymmetric structure, where metadata is extracted from actual data and stored separately, and a metadata server and a data server manage the metadata and the actual data respectively. Herein, the metadata means the address information of the data server storing the actual data of files.

The data server storing and managing each data provides actual data, which is stored in a disk, upon user's request over networks. However, there exist limitations in service performance provided by one data server due to the disk performance of the data server or the transmission performance of the network.

For example, in case that a large scale video service such as User Created Contents (UCC) is provided, many read requests occur in a specific data server storing and managing corresponding data when many accesses occur in a specific video file for a certain time interval. However, since data services can only be provided up to the highest performance of the disk or the network, a failure (for example, the interruption of a video service) might occur in an additional data service or even the video service for existing users.

In the asymmetric storage system, when intensive read requests from many users for a certain time interval occur for a specific file (hereinafter, which is referred to as "hot data"), data services cannot be provided smoothly due to limitations in the physical performances (that is, the performances of the disk and the network) of the data server storing and managing the data of the specific file. If metadata hit counter of a single metadata server instead of the data server is used to sense the hot data to solve this problem, the number of file read requests, which is the actual load of data, cannot be traced. Moreover, since the hit counter value should be updated each time the metadata is accessed, a lot of loads occur in the system.

Meanwhile, hot data may not be the hot data any more with the passage of time. If it is not considered, copies of the data made to solve the hot data problem waste storage.

SUMMARY

In one general aspect of the present invention, a hot data management method based on hit counter includes: checking, by each data server of an asymmetric storage system, hit counter for data stored in the data server to maintain hit counter information on the data to a latest state; transmitting, by the data server, the hit counter information to a metadata server at predetermined intervals; and performing, by the data server, making or deletion of a copy of the data according to a determination of the metadata server.

In another general aspect, a hot data management method based on hit counter includes: configuring a hot data management table including a hit counter field for each data; collecting hit counter information on data from at least one of the data servers, where the corresponding data is stored; updating the hot data management table on the basis of the hit counter information; checking the hot data management table at a predetermined interval to determine whether a data file is hot data; making a copy of the data file, which is determined as the hot data, in a new data server; and deleting a copy of the data file which is no longer the hot data according to a result of the determination.

In another general aspect, a hot data management method includes: maintaining, by a plurality of data servers, data hit counter for data stored and managed by the corresponding data servers for a certain duration; transmitting, by the data servers, the data hit counter of the stored data to a management server at certain intervals; collecting and storing, by the management server, the transmitted data hit counter; and recognizing, by the management server, data, where hit counter for the data server is more than a predetermined threshold value within each interval, as a hot data, and making an additional copy of the hot data in at least one of the data servers, at certain intervals.

Other features and aspects will be apparent from the following detailed description, the drawings, and the claims.

DETAILED DESCRIPTION OF EMBODIMENTS

Figure 1:
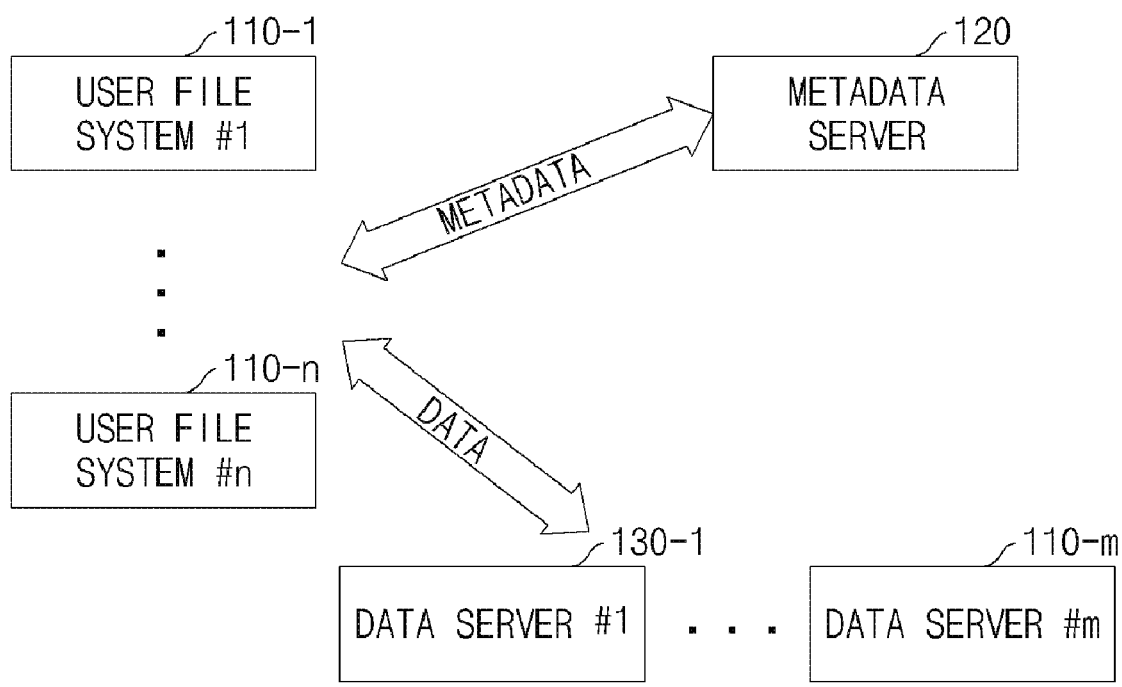
FIG. 1 is a block diagram of an asymmetric storage system which is applied to exemplary embodiments of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/of systems described herein will be suggested to those of ordinary skill in the art. Also, descriptions of well-known functions and constructions may be omitted for increased clarity and conciseness.

FIG. 1 is a block diagram of an asymmetric storage system which is applied to exemplary embodiments of the present invention.

Referring to FIG. 1, an asymmetric storage system applied to exemplary embodiments includes the n units of user file systems 110-1 to 110-n (n is a natural number larger than 1), a metadata server 120, and the m units of data servers 130-1 to 130-m (m is a natural number larger than 1).

The user file systems 110-1 to 110-n receive a file-related user's request. At this point, the user file systems 110-1 to 110-n request metadata to the metadata server 120 according to the user's request, and request the actual data of a file to the data servers 130-1 to 130-m The metadata server 120, which manages address information of the actual data of the file, checks whether the request of the specific user file system of the user file systems 110-1 to 110-n is suitable, and transmits the requested metadata (i.e., the address information of a file data) to the specific user file system over a network.

The data servers 130-1 to 130-m, which manage the actual data of the file, transfer the data of a disk to the specific user file system according to its request.

Figure 2:
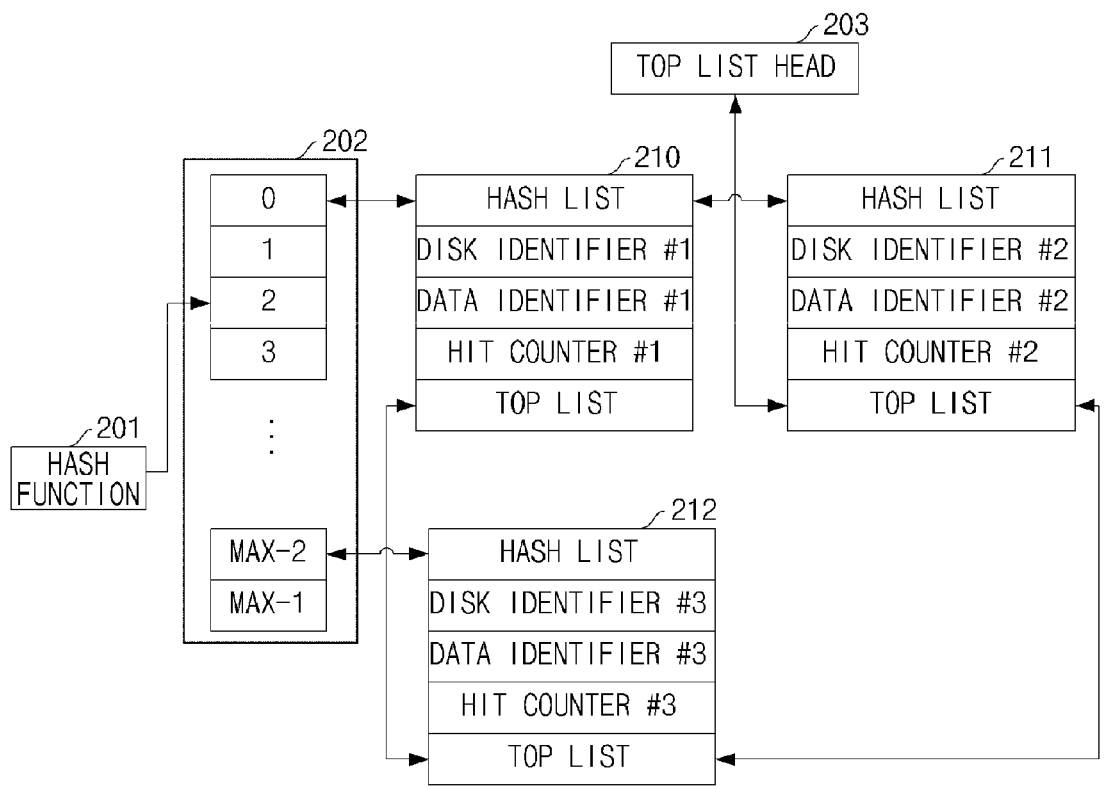
FIG. 2 is a diagram illustrating the configuration of a data hit counter entry according to en exemplary embodiment.

To collect information on the occurrence of a read load, the data servers 130-1 to 130-m maintain data hit counter for the data read request of the user as shown in FIG. 2.

Each of data hit counter entries 210 to 212 includes a data identifier field and a disk identifier field for discriminating data, a hit counter field for recording hit counter, a hash list field, and a top list field, and a hash function 201 and a hash table 202 including the MAX units of hash heads are used to search data hit counter entry rapidly according to the user's read request.

The hash function 201 has the data identifier of a user request, and receives a result value which is obtained by dividing the data identifier by MAX (data identifier % MAX). The hash result value is the value of one entry in the hash table 202.

When the same hash result value as a result value of other data identifier divided by the MAX is obtained, data hit counter entries are connected as a chain through a hash list field including previous entry information and next entry information, like the data hit counter entries 210 and 211 of FIG. 2.

To maintain the rank of the hit counter for data, the data hit counter entries 210 to 212 form a connection using a top list field which includes the previous entry information and the next entry information of the data hit counter entries, with a top list head as a starter.

In FIG. 2, the data hit counter entry 211 is disposed next to the top list head, and thereafter the data hit counter entry 212 and the data hit counter entry 210 are sequentially chained. Herein, as a data hit counter entry is nearer to the top list head, it may be configured to be a data hit counter entry for a file having high priority, i.e., many hit counters. For example, the data hit counter entry 211 may be configured to be a data hit counter entry for a file having high priority, i.e., many hit counters.

Figure 3:
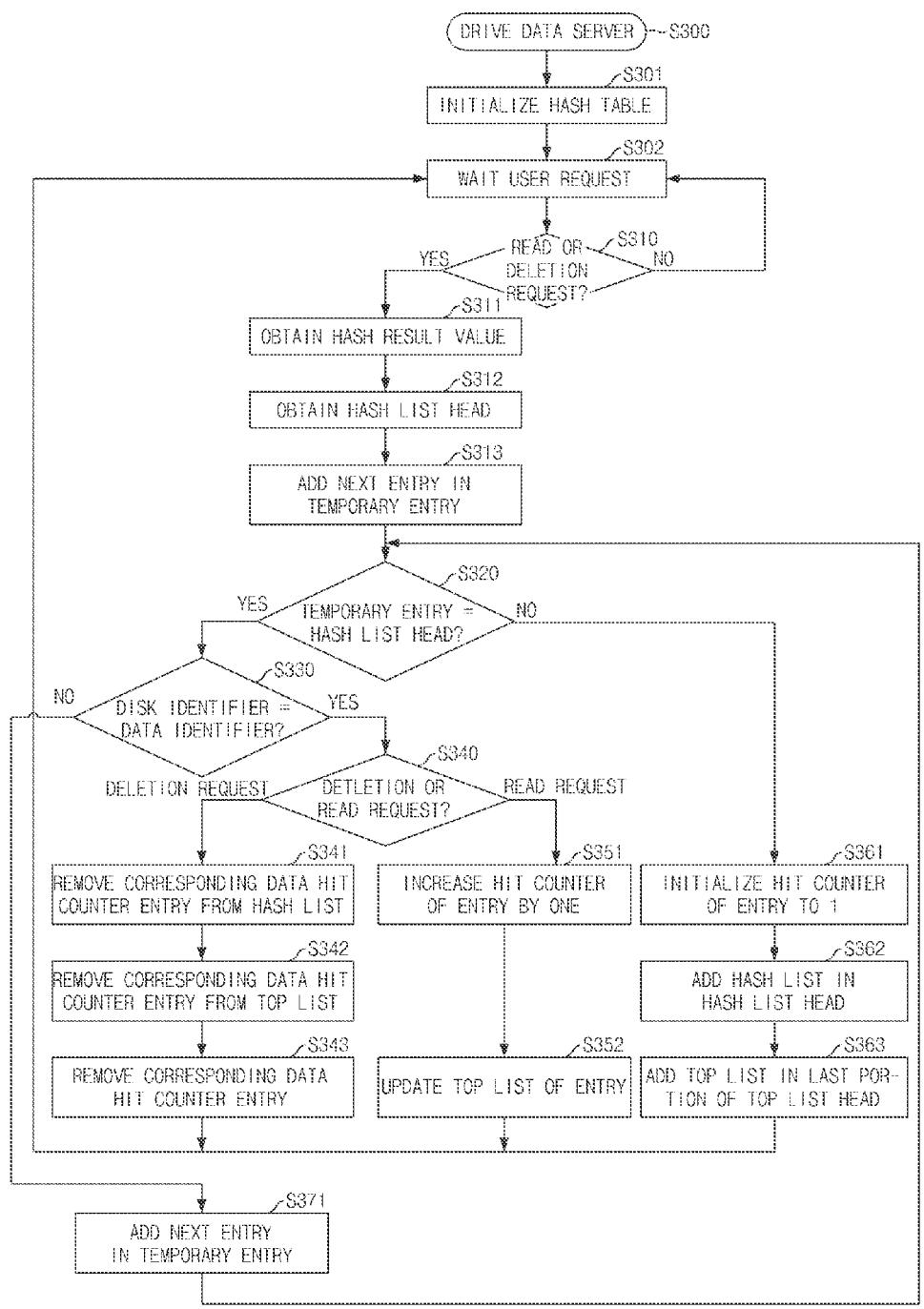
FIG. 3 is a flowchart illustrating a method for processing data hit counter according to an exemplary embodiment.

FIG. 3 is a flowchart illustrating a method for processing data hit counter according to an exemplary embodiment. Hereinafter, a data server is any one of the data servers 130-1 to 130-m in FIG. 1.

Referring to FIG. 3, when the data server is driven, it initializes the hash table in operation S301, and waits a user's request in operation S302. At this point, when the user's request on read or deletion is received in operation S310, data hit counter is updated through the following process.

The data server substitutes the data identifier for the hash function to obtain a hash result value in operation S311. Subsequently, the data server obtains the entry of a hash table, i.e., a hash list head as the hash result value in operation S312, and adds a next entry in a temporary entry in operation S313.

The data server determines whether the temporary entry is the same as the hash list head in operation S320. When the determination result shows that the temporary entry is the same as the hash list head, the data server determines whether a data identifier is the same as a disk identifier based on a user's request in operation S330. When the determination result shows that the data identifier is the same as the disk identifier, the data server determines whether the user request is a deletion request or a read request in operation S340.

When the determination result shows that the user request is the deletion request, the data server removes a corresponding data hit counter entry from the hash list in operation S341, and also removes the corresponding data hit counter entry from the top list in operation S342. The data server removes the corresponding data hit counter entry in operation S343.

When the determination result in operation S340 shows that the user request is the read request, the data server increases the hit counter of the corresponding data hit counter entry once in operation S351, and updates the top list of the corresponding data hit counter entry in operation S352.

When the determination result in operation S320 shows that the temporary entry is the same as the hash list head, the data server generates a new data hit counter entry, adds the disk identifier and the data identifier in the new data hit counter entry, and initializes the hit counter of the new data hit counter entry to '1' in operation S361. Subsequently, the data server adds the hash list of the new data hit counter entry in the hash list head in operation S362, and adds the top list of the new data hit counter entry in the last portion of the top list head in operation S363.

When the determination result in operation S330 shows that the disk identifier is the same as the data identifier, the data server adds a next entry in a temporary data hit counter entry in operation S371, and returns to operation S320.

When a data read request or a data deletion request is received, the data server adds a data identifier in the hash function to obtain a result value, and checks whether a data hit counter entry including a corresponding data identifier exists in the entry of the hash table, i.e., the hash list head. When the data hit counter entry exists and a user request is the read request, the data server increases a hit counter field by one and updates the top list of the entry. When the data hit counter entry does not exist, the data server generates a new data hit counter entry to initialize it, and add the initialized entry in the hash list head. When the data hit counter entry exists and the user request is the deletion request, the data server removes a corresponding data hit counter entry.

Figure 4:
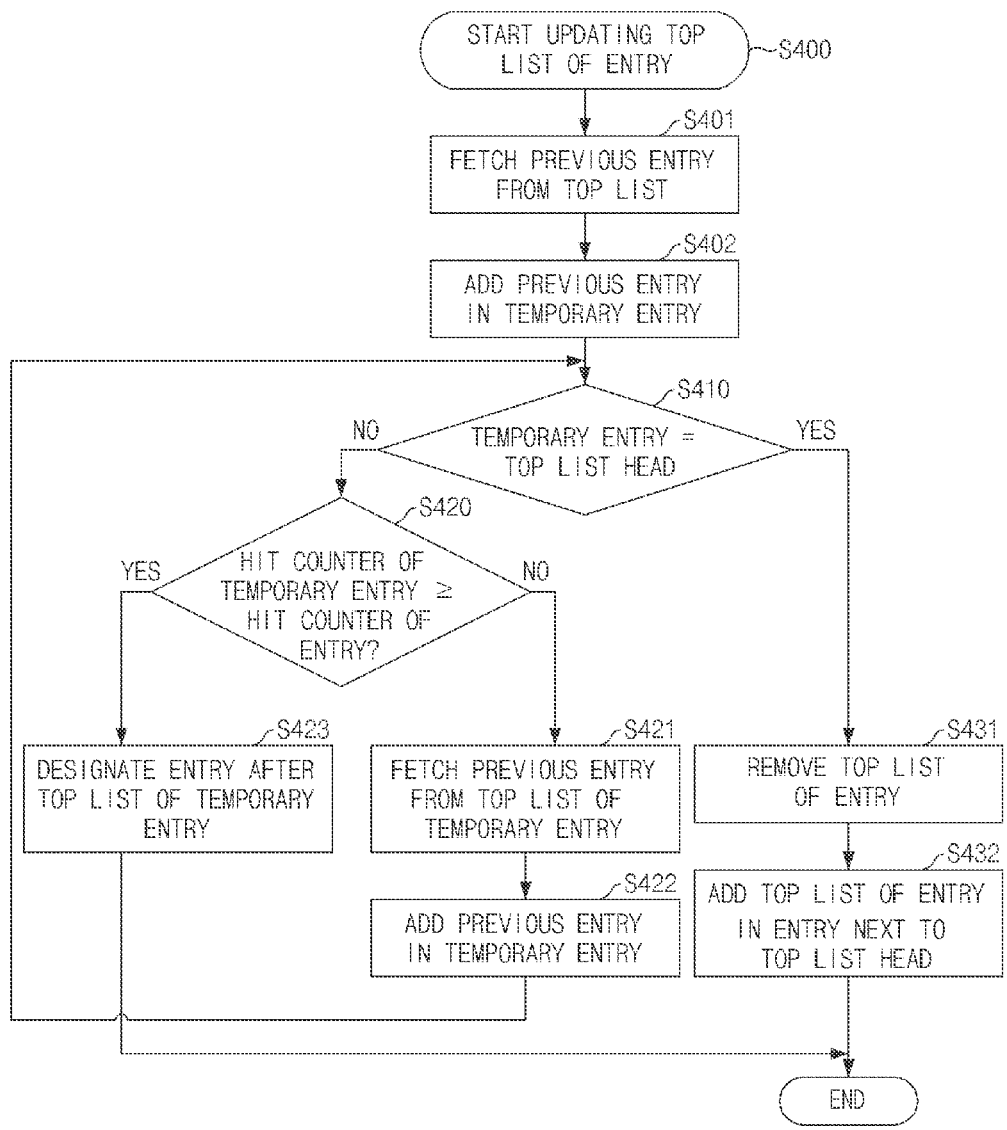
FIG. 4 is a flowchart illustrating a method for changing the rank of data hit counter according to an exemplary embodiment.

FIG. 4 is a flowchart illustrating a method for changing the rank of data hit counter according to an exemplary embodiment.

Referring to FIG. 4, the data server fetches a previous entry from the top list of a corresponding data hit counter entry having the increased data hit counter in operation S401, and adds the previous entry in a temporary entry in operation S402.

The data server determines whether the temporary entry is the same as the top list head in operation S410. When the determination result shows that the temporary entry is not the same as the top list head, the data server determines whether the hit counter of the temporary entry is equal to or more than the hit counter of the data hit counter entry in operation S420.

When a temporary entry having hit counter (which is equal to or more than the hit counter of the data hit counter entry) is found as a result of the determination, a corresponding data hit counter entry is designated next to the top list of the temporary entry (which is a data hit counter entry added in a current temporary entry) in operation S423. Furthermore, the temporary entry is designated previous to the corresponding data hit counter entry. Through these processes, the ranks of the data hit counter entries may be changed.

When the temporary entry having hit counter (which is equal to or more than the hit counter of the data hit counter entry) is not found as a result of the determination in operation S420, the data server fetches a previous entry from the top list of the temporary entry in operation S421, and adds the fetched previous entry in the temporary entry in operation S422. In these processes, the data server searches entries having high priority, i.e., more hit counters.

When an entry having hit counter (which is equal to or more than that of a corresponding data hit counter entry) is not found to the top list head, since the corresponding data hit counter entry is an entry having the highest priority, the data server removes the current contents of the top list of the data hit counter entry in operation S431. Moreover, the data server designates the top list of the data hit counter entry as the next entry of the top list head in operation S432.

Figure 5:
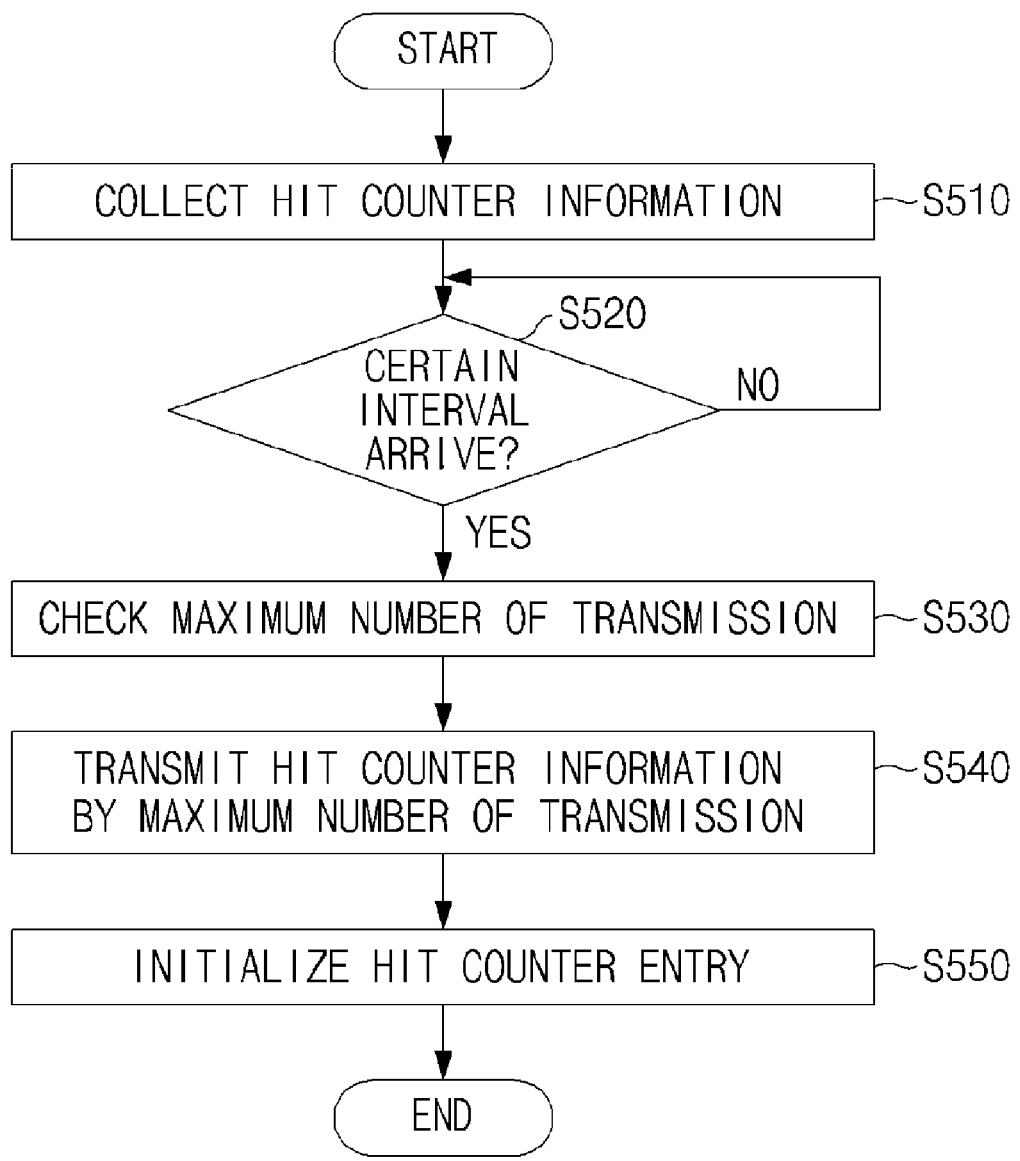
FIG. 5 is a flowchart illustrating a method for transmitting data hit counter according to an exemplary embodiment.

FIG. 5 is a flowchart illustrating a method for transmitting data hit counter according to an exemplary embodiment.

Referring to FIG. 5, each of the data servers collects data hit counter in operation S510, and determines whether it arrives at a predetermined interval in operation S520. When the determination result shows that the predetermined interval arrives, the data server checks the maximum number of transmission in operation S530, and transmits hit counter information by the checked number to a metadata server in operation S540. Subsequently, the data server initializes a hit counter entry in operation S550.

Operation S530 for checking the maximum number of transmission need not be performed every time.

Figure 6:
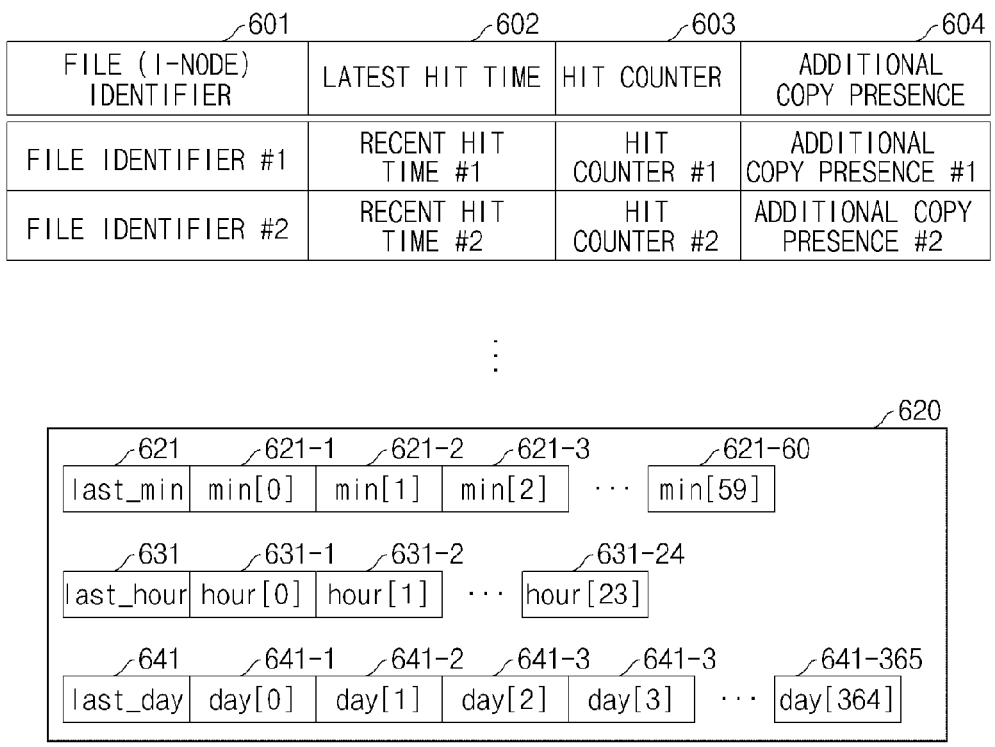
FIG. 6 is a diagram illustrating the configuration of a hot data management table which is included in a metadata server receiving hit counter information according to an exemplary embodiment.

FIG. 6 is a diagram illustrating the configuration of a hot data management table which is included in a metadata server receiving hit counter information according to an exemplary embodiment.

As shown in FIG. 6, the hot data management table to be stored in a database (DB) included in the metadata server includes a file (i-node) identifier field 601, a latest hit time field 602, a hit counter field 603, and an additional copy presence field 604.

The file identifier field 601 is a value for discriminating a file, and is an i-node identifier in a Virtual File System (VFS).

The latest hit time field 602 maintains latest time information where the hit counter value of file data received from the data servers is updated.

The additional copy presence field 604 is for tracing and managing hot data, and represents an additional copy for solving the hot data.

A reference number 620 represents the configuration of the hit counter field 603. min[0] to min[59] (which are fields 621-1 to 621-60) represent a file hit counter value on a minute-by-minute basis from the time of last_min (which is a field 621). hour[0] to hour[23] (which are fields 631-1 to 631-24) represent a file hit counter value on an hourly basis from the time of last_hour (which is a field 631). day[0] to day[364] (which are fields 641-1 to 641-365) represent a file hit counter value on a daily basis from the time of last_day (which is a field 641).

Figure 7:
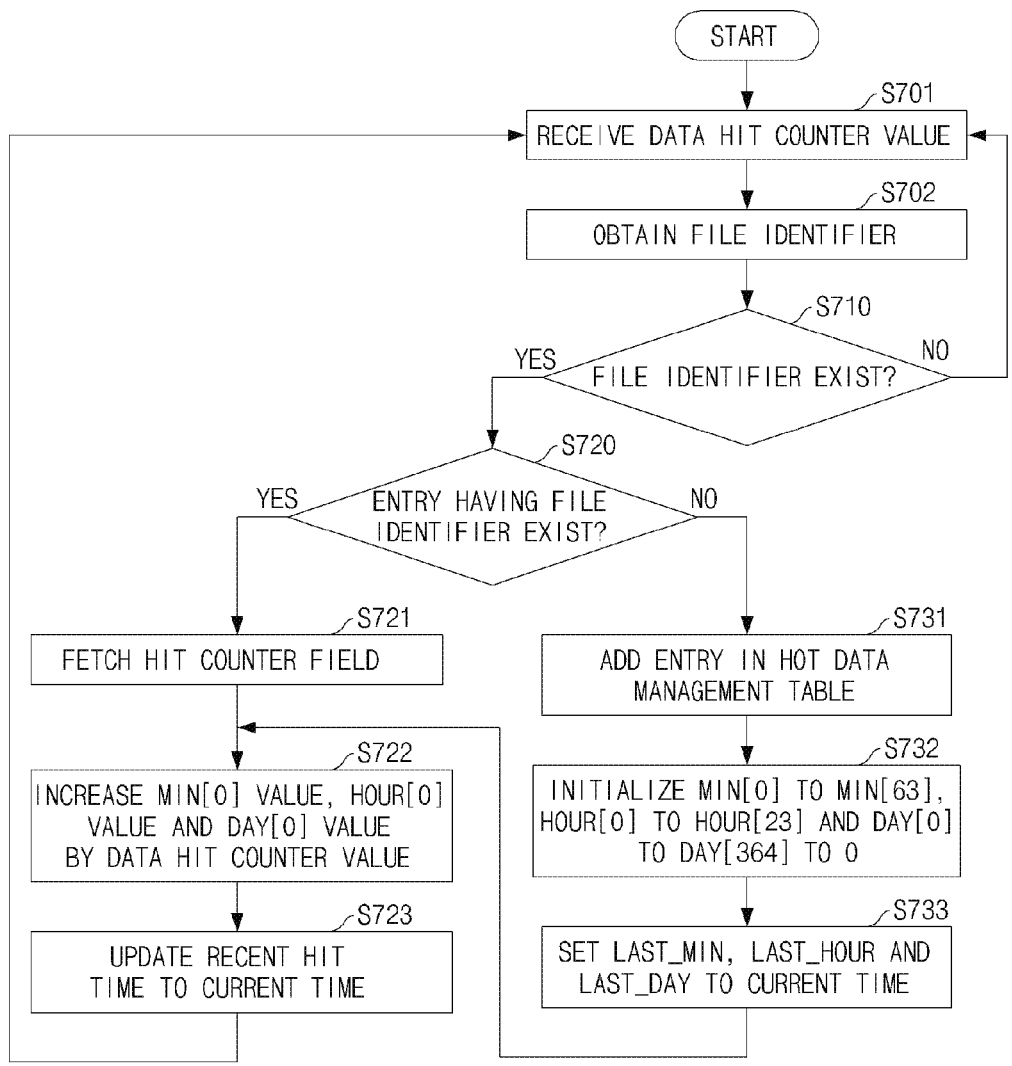
FIG. 7 is a flowchart illustrating a method for storing data hit counter information according to an exemplary embodiment.

FIG. 7 is a flowchart illustrating a method for storing data hit counter information according to an exemplary embodiment. That is, FIG. 7 illustrates a process for storing data hit counter information (for example, a disk identifier, a data identifier, and hit counter) received from the data servers in the hot data management table. Hereinafter, a metadata server is the same as the metadata server 120 in FIG. 1, and a data server is any one of the data servers 130-1 to 130-m in FIG. 1.

Referring to FIG. 7, the metadata server receives a data hit counter value from the data server in operation S701, and obtains a file identifier including a disk identifier and a data identifier in operation S702.

The metadata server determines whether a file identifier corresponding to the disk identifier and the data identifier exists in operation S710. When the determination result shows that the file identifier does not exist, the metadata server recognizes a corresponding file as a deleted file. The metadata server returns to operation S701 and obtains other data hit counter information.

When the determination result shows that the file identifier exists, the metadata server determines whether a data hit counter entry having the file identifier exists in a preset hot data management table in operation S720.

When the determination result shows that the data hit counter entry having the file identifier exists in the preset hot data management table, the metadata server fetches the hit counter field of the hot data management table in operation S721, and increases the specific fields of the hit counter field, for example, the value of the min[0], the value of the hour[0] and the value of the day[0], by a data hit counter value in operation S722. The metadata server updates a latest hit counter to the current time in operation S723, thereby updating the hit counter field.

When the determination result in operation S720 shows that the data hit counter entry having the file identifier does not exist in the preset hot data management table, the metadata server adds a new data hit counter entry having the file identifier in the hot data management table in operation S731. The metadata server initializes all the fields of the hit counter filed of the new data hit counter entry, i.e., the min[0] to min[63], the hour[0] to hour[23] and the day[0] to day[364], to "0" in operation S732. Subsequently, the metadata server sets the last_min, last_hour and last_day of the hit counter field of the new data hit counter entry to the current time in operation S733, and proceeds to operation S722 of increasing the fields.

Figure 8:
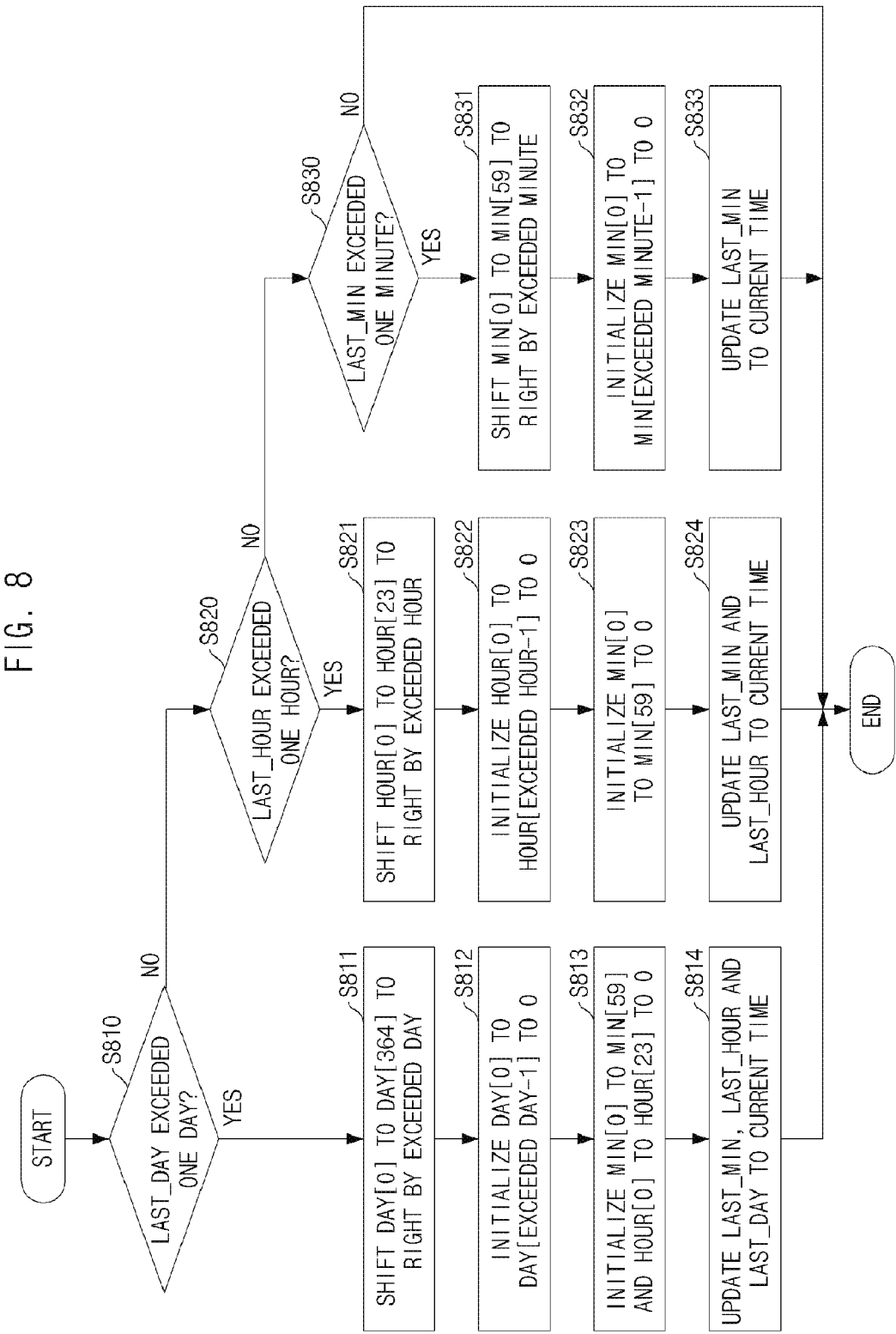
FIG. 8 is a flowchart illustrating a method for updating a hit counter field according to an exemplary embodiment.

FIG. 8 is a flowchart illustrating a method for updating a hit counter field according to an exemplary embodiment. That is, FIG. 8 illustrates a process for updating the hit counter field (i.e., the min[0] to min[59], the hour[0] to hour[23] and the day[0] to day[364]) of the hot data management table based on the current time. Hereinafter, a metadata server is the same as the metadata server 120 in FIG. 1.

Referring to FIG. 8, the metadata server compares the current time with the last_day of the hit counter field to determine whether the last_day has exceeded one day in operation S810.

When the determination result shows that the last_day has exceeded one day, the metadata server shifts the day[0] to day[364] of the hit counter field to the right by the exceeded day in operation S811, and initializes the fields from the day[0] to the day[exceeded day-1] to "0" in operation S812. The metadata server initializes the min[0] to min[59] and hour[0] to hour[23] of the hit counter field to "0" in operation S813, and updates the last_min, last_hour and last_day to the current time in operation S814.

When the determination result in operation S810 shows that the last_day has not exceeded one day, the metadata server compares the current time with the last_hour of the hit counter field to determine whether the last_hour has exceeded one hour in operation S820.

When the determination result in operation S820 shows that the last_hour has exceeded one hour, the metadata server shifts the hour[0] to hour[23] of the hit counter field to the right by the exceeded hour in operation S821, and initializes the fields from the hour[0] to the hour[exceeded hour-1] to "0" in operation S822. The metadata server initializes the min[0] to min[59] of the hit counter field to "0" in operation S823, and updates the last_min and last_hour to the current time in operation S824.

When the determination result in operation S820 shows that the last_hour has not exceeded one hour, the metadata server compares the current time with the last_min of the hit counter field to determine whether the last_min has exceeded one minute in operation S830. When the determination result shows that the last_min has not exceeded one minute, the metadata server terminates the update of the hit counter field.

When the determination result in operation S830 shows that the last_min has exceeded one minute, the metadata server shifts the min[0] to min[59] of the hit counter field to the right by the exceeded minute in operation S831, and initializes the fields from the min[0] to the min[exceeded minute-1] to "0" in operation S832. The metadata server updates the last_min to the current time in operation S833.

Figure 9:
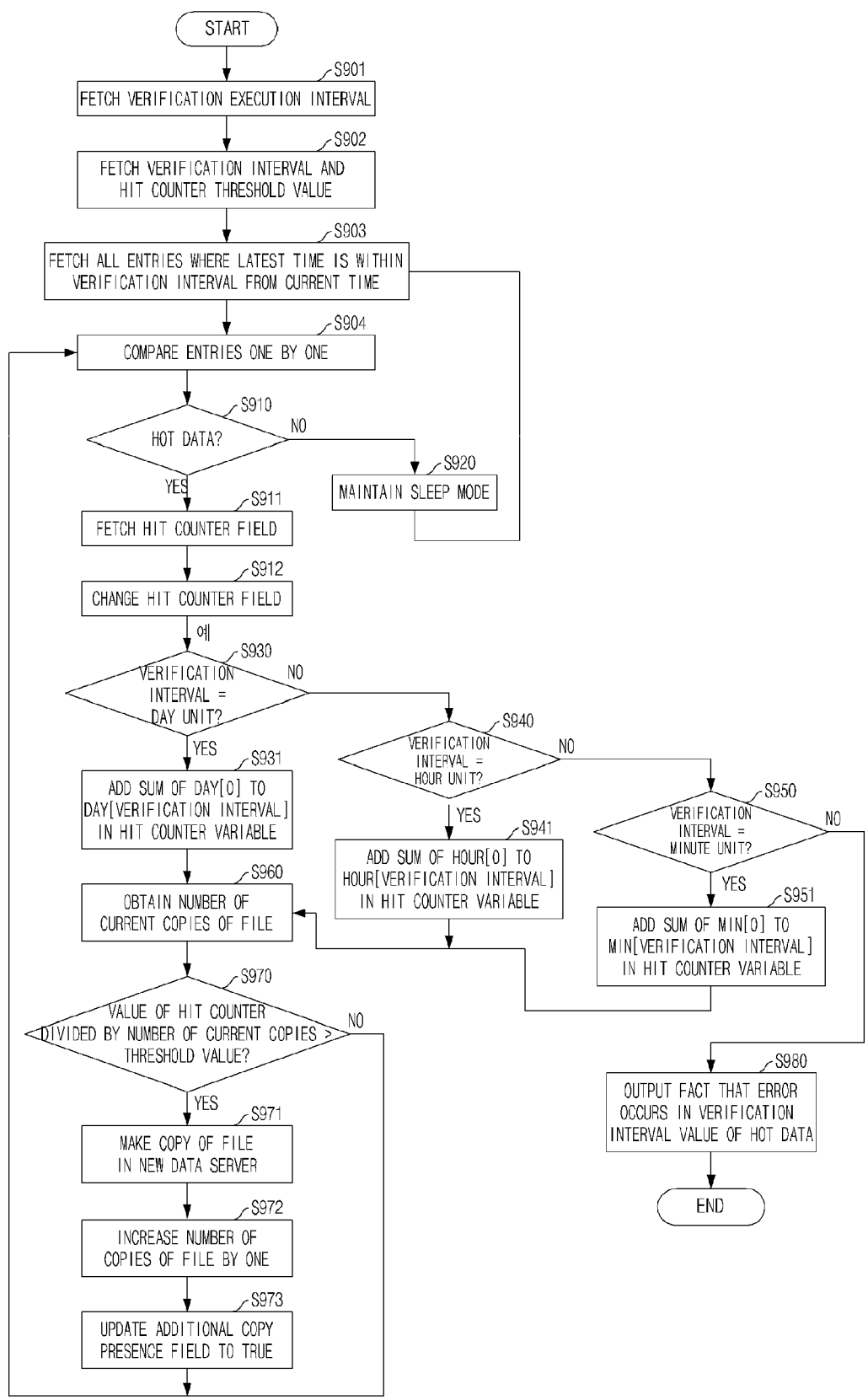
FIG. 9 is a flowchart illustrating a method for sensing and copying hot data according to an exemplary embodiment.

FIG. 9 is a flowchart illustrating a method for sensing and copying hot data according to an exemplary embodiment. Hereinafter, the metadata server is the same as the metadata server 120 of FIG. 1.

Referring to FIG. 9, the metadata server fetches a verification execution interval from the hot data management table in operation S901, and fetches a verification interval and a hit counter threshold value from the hot data management table in operation S902. The metadata server fetches all entries, in which a latest hit time is within the verification interval from the current time, from the hot data management table in operation S903. The metadata server checks the fetched entries one by one to determine whether the fetched entries are the hot data in operations S904 and S910. When the determination result shows that the fetched entries are not the hot data, the metadata server maintains a sleep mode for the verification execution interval in operation S920, and returns to operation S903 of fetching the entry.

When the determination result shows that the fetched entries are the hot data, the metadata server fetches the hit counter field of the hot data management table in operation S911, and changes the hit counter field based on the current time in operation S912. The metadata server determines whether the verification interval is a unit of a day in operation S930. When the determination result shows that the 25 verification interval is a day unit, the metadata server sums the values of the day[0] to day[verification interval] of the hit counter field and thereby adds the sum value in a hit counter variable in operation S931. The metadata server obtains the number of current copies of the file an entry in the hot data management table in operation S960, and determines whether the value of the hit counter divided by the number of the current copies is more than a threshold value in operation S970. When the determination result shows that the divided value is not more than the threshold value, the metadata server returns to operation S904 of checking the entry.

When the determination result in operation S970 shows that the divided value is more than the threshold value, the metadata server recognizes the hit counter value of the file as the hot data, and makes a copy of the file in a new data server in operation S971. The metadata server increases the number of copies of the file by one in operation S972. Afterwards, the metadata server updates the additional copy presence field of the entry of the hot data management table to "true" in operation S973.

When the determination result in operation S930 shows that the verification interval is not a day unit, the metadata server determines whether the verification interval of the hot data is a unit of an hour in operation S940. When the results shows that the interval is an hour unit, the metadata server sums the values of the hour[0] to hour[verification interval] of the hit counter field and thereby adds the sum value in the hit counter variable in operation S941, and thereafter performs the processes next to operation S960 of obtaining the number of the current copies.

When the determination result in operation S940 shows that the verification interval of the hot data is not an hour unit, the metadata server determines whether the verification interval of the hot data is a unit of a minute in operation S950. When the results shows that the interval is a minute unit, the metadata server sums the values of the minute[0] to minute [verification interval] of the hit counter field and thereby adds the sum value in the hit counter variable in operation S951, and thereafter performs the processes next to operation S960 of obtaining the number of the current copies.

When the determination result in operation S950 shows that the verification interval of the hot data is not a minute unit, the metadata server outputs the fact that an error occurs in the verification interval value of the hot data in operation S980.

Figure 10:
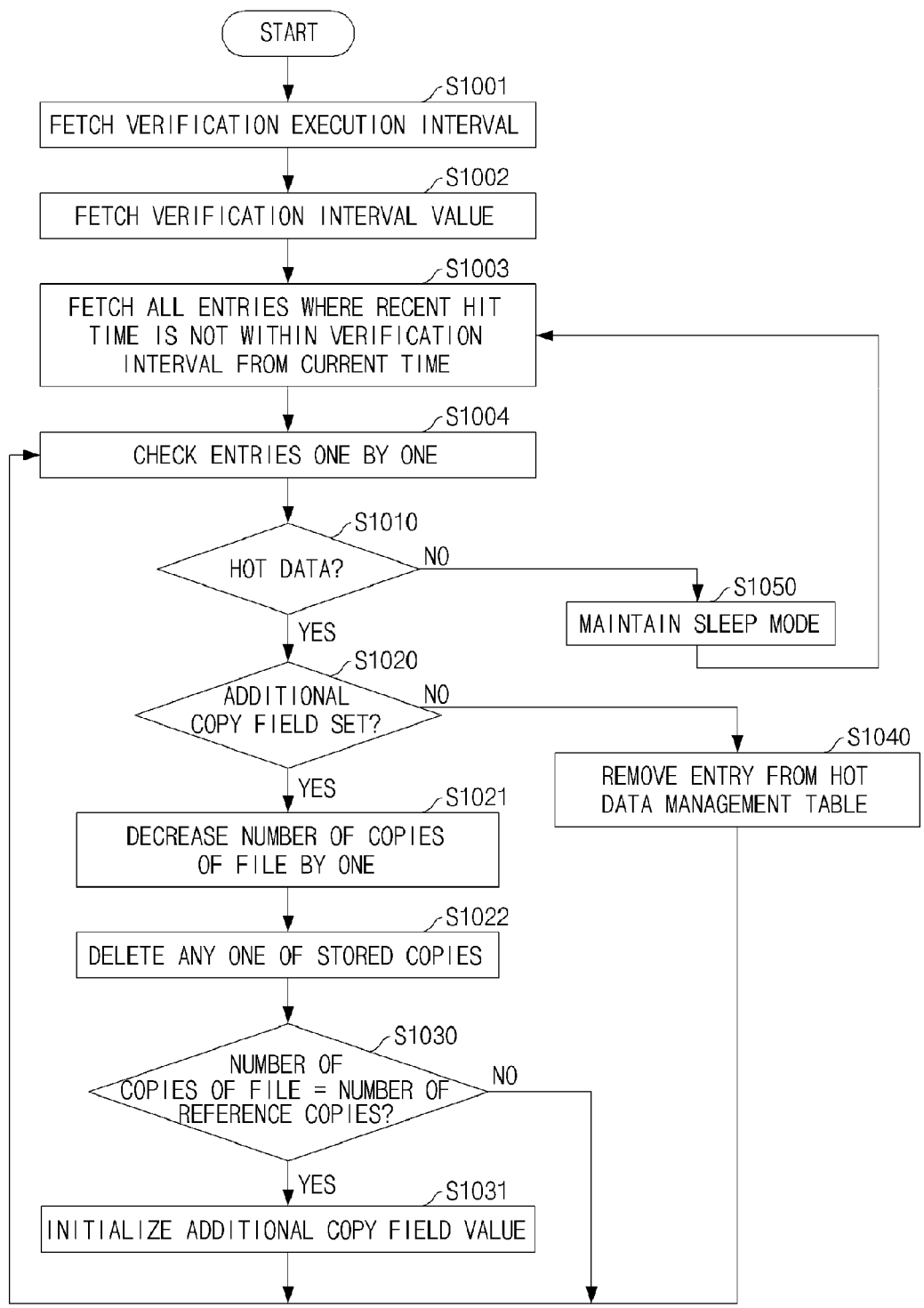
FIG. 10 is a flowchart illustrating a method for withdrawing the additional copies of a file according to an exemplary embodiment.

FIG. 10 is a flowchart illustrating a method for withdrawing the additional copies of a file according to an exemplary embodiment. Hereinafter, the metadata server is the same as the metadata server 120 of FIG. 1.

Referring to FIG. 10, the metadata server fetches a verification execution interval from the hot data management table in operation S1001, and fetches a verification interval value from the hot data management table for sensing the hot data in operation S1002. The metadata server fetches all entries, in which a latest hit time is not within the verification interval from the current time, from the hot data management table in operation S1003. The metadata server checks the fetched entries one by one to determine whether the fetched entries are represented as the hot data in operations S1004 and S1010. When it turned out to be not the hot data, the metadata server maintains a sleep mode by the verification execution interval in operation S1050, and returns to operation S1003 of fetching the entry.

When the determination result shows that the fetched entries are the hot data, the metadata server determines whether the additional copy field is set in the hot data management table in operation S1020.

When the determination result in operation S1020 shows that the additional copy field is set in the hot data management table, the metadata server decreases the number of copies of the file in the entry by one in operation S1021, and deletes any one of the copies which are stored in the data server in operation S1022.

The metadata server determines whether the number of copies of the file in the entry is the same as the number of predetermined reference copies in operation S1030. When the determination result shows that the number of copies of the file is the same as the number of the predetermined reference copies, the metadata server initializes the additional copy field value of the entry in operation S1031, and returns to operation S1004 of checking the entry. When the determination result shows that the number of copies of the file is not the same as the number of the predetermined reference copies, the metadata server returns to operation S1004 of checking the entry.

When the determination result in operation S1020 shows that the additional copy field is not set in the hot data management table, the metadata server removes the entry from the hot data management table in operation S1040, and returns to operation S1004 of checking the entry.

The metadata server fetches the entries having no hit from the current time to the verification interval when fetching the entries in operation S1003. Thus, when the fetched entry is determined as an entry associated with the hot data in operations S1004 to S1040 next to operation S1003, the metadata server determines that the fetched entry is not the hot data at present although the fetched entry was the hot data in the past, and performs the above-described processes.

In FIG. 10, the metadata server detects data which is no longer the hot data at present although the data were the hot data in the past, and removes the copy of the data, leading to decrease in waste of a storage.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hot data management method based on a hit counter, comprising:
    checking, by data servers of an asymmetric storage system, the hit counter for data stored in the data servers to maintain hit counter information on the data in a latest state;
    transmitting, by the data servers, the hit counter information to a metadata server at predetermined intervals; and
    performing, by the data server, making or deletion of a copy of data according to a determination of the metadata server,
    wherein the maintaining of hit counter information comprises:
        configuring one or more data hit counter entries comprising a data identifier field and a disk identifier field for discriminating data, a hit counter field for recording hit counter, and a top list field for connecting each of the data hit counter entries;
        preparing a hash table comprising a predetermined number of hash heads for rapidly discriminating the hit counter entry; and
        managing the hit counter for data using the data hit counter entry and the hash table,
    wherein the managing of hit counter for data comprises:
        adding a data identifier in a hash function to obtain a result value, and checking whether a data hit counter entry having a corresponding data identifier exists in the hash head, when a data read or deletion request is received;
        increasing the hit counter field by one when the data hit counter entry exists and the read request is received and changing a rank of the data hit counter entry;
        generating a new data hit counter entry when the data hit counter entry does not exist and the data read request is received; and
        removing a corresponding data hit counter entry when the data hit counter entry exists and the deletion request is received,
    wherein the changing of a rank comprises:
        searching a data hit counter entry having higher priority than the data hit counter entry having the increased data hit counter; and
        adjusting a rank of the data hit counter entry as a rank next to the searched data hit counter entry when the data hit counter entry having higher priority is searched, and adjusting the data hit counter entry as an entry having highest priority when the data hit counter entry having higher priority is selected.

2. The hot data management method of claim 1, wherein the changing of a rank comprises:
    checking a previous data hit counter entry in a top list of the data hit counter entry having the increased data hit counter;
    designating the previous data hit counter entry as a temporary entry;
    setting the data hit counter entry as an entry next to the temporary entry, when data hit counter of the temporary entry is equal to or more than the data hit counter of the data hit counter entry; and
    updating a previous entry in a top list of the temporary entry to a temporary entry when the data hit counter of the temporary entry is less than the data hit counter of the data hit counter entry, and repeating the updating of the previous entry until the data hit counter of the temporary entry is equal to or more than the data hit counter of the data hit counter entry.

3. The hot data management method of claim 1, wherein the generating of a new data hit counter entry comprises:
    generating a data structure comprising the disk identifier field, the data identifier field, the hit counter field, and the top list field;
    adding a disk identifier and a data identifier for corresponding data in the disk identifier field and the data identifier field;
    initializing the data hit counter field to "1";
    adding a hash result value of the data identifier in one hash head of the hash table; and
    setting a value of the top list field to have lowest priority.

4. The hot data management method of claim 1, wherein the transformation of the hit counter information comprises:
    transmitting hit counter information on corresponding data by the predetermined maximum number of transmission in descending order of hit counter for data; and
    initializing the data hit counter entry.

5. A hot data management method based on a hit counter, comprising:

configuring a hot data management table comprising a hit counter field and a top list field for connecting data for each data;
collecting hit counter information on data, which is stored in data servers, from at least one of the data servers;
updating the hot data management table on the basis of the hit counter information;
checking the hot data management table at predetermined intervals to determine whether a data file is hot data;
making a copy of the data file, which is determined as the hot data, in a new data server; and
deleting a copy of the data file which is no longer the hot data according to a result of the determination,
wherein the making a copy of a data file comprises:
copying data, which are determined as the hot data, in the new data server;
increasing the number of copies of a file by one; and
setting an additional copy presence field of an entry of the hot data management table to "true".

6. The hot data management method of claim 5, wherein the updating of the hot data management table comprises:
obtaining a file identifier from a data identifier and a disk identifier comprised in the received hit counter information;
updating a corresponding entry on the basis of the hit counter information, when an entry having the file identifier exists in the hot data management table; and
adding and initializing a new entry when an entry having the file identifier does not exist in the hot data management table.

7. The hot data management method of claim 6, wherein the updating of a corresponding entry comprises:
obtaining an exceeded day, an exceeded hour or an exceeded minute from a most recent update time to a current time;
shifting min[0] to min[63], hour[0] to hour[23], or day[0] to day[364] array constituting the hit counter field to the right by the exceeded day, the exceeded hour or the exceeded minute;
increasing a value of the min[0], a value of the hour[0], or a value of the day[0] by the data hit counter value; and
updating a latest hit time to the current time.

8. The hot data management method of claim 6, wherein the adding and initializing of a new entry comprises:
initializing min[0] to min[63], hour[0] to hour[23], and day[0] to day[364] of a hit counter field of the new entry to "0";
setting a last_min, last_hour and last_day of the hit counter field of the new entry to a current time; and
adding the new entry in the hot data management table.

9. The hot data management method of claim 5, wherein the determining whether a data file is hot data comprises:
checking a verification execution interval;
calculating hit counter for a duration within the verification execution interval based on a current time, on an entry which is updated within the verification execution interval based on the current time among entries in the hot data management table;
checking the number of copies of a data file corresponding to the entry;
determining whether a value of the hit counter divided by the number of the copies is more than a predetermined threshold value; and
determining data corresponding to the entry as hot data when the divided value is more than the predetermined threshold value.

10. The hot data management method of claim 9, wherein the calculating of hit counter comprises:
summing day[0] to day[verification interval] values of the hit counter field to calculate hit counter, when the verification execution interval is a day unit;
summing hour[0] to hour[verification interval] values of the hit counter field to calculate hit counter, when the verification execution interval is an hour unit; and
summing minute[0] to minute[verification interval] values of the hit counter field to calculate hit counter, when the verification execution interval is a minute unit.

11. The hot data management method of claim 5, wherein the deleting of a copy comprises:
checking an entry, which is not the hot data at present although the entry was the hot data in the past, among entries in the hot data management table;
decreasing the number of copies of a file corresponding to the checked entry by one; and
deleting any one of a plurality of existing copies.

12. The hot data management method of claim 11, further comprising initializing an additional copy field value of the entry, when the number of copies of the file is the same as a number of predetermined reference copies.

13. The hot data management method of claim 11, further comprising removing the checked entry from the hot data management table, when an additional copy field is not set in the checked entry.

14. The hot data management method of claim 11, wherein the checking of an entry comprises:
checking a value of a latest hit time field of each entry in the hot data management table; and
selecting an entry where the checked latest hit time is not within a verification interval from a current time.

* * * * *